United States Patent [19]

Cracknell et al.

[11] Patent Number: 5,652,204
[45] Date of Patent: Jul. 29, 1997

[54] LUBRICATING OIL COMPOSITIONS CONTAINING SPECIFIED END-CAPPED POLYETHERS

[75] Inventors: Robert Brian Cracknell, Lymington; John Robert Moxey, Southampton, both of England

[73] Assignee: Oceanfloor Limited, Southampton, England

[21] Appl. No.: 713,437

[22] Filed: Sep. 17, 1996

Related U.S. Application Data

[63] Continuation of Ser. No. 246,927, May 20, 1994, abandoned, which is a continuation of Ser. No. 992,244, Dec. 14, 1992, abandoned.

[30] Foreign Application Priority Data

Dec. 24, 1991 [GB] United Kingdom ............... 9127379

[51] Int. Cl.$^6$ .............................................. C10M 145/34
[52] U.S. Cl. ........................ 508/562; 508/563; 508/570; 508/579; 508/580
[58] Field of Search ............................. 508/562, 563, 508/570, 579, 580

[56] References Cited

U.S. PATENT DOCUMENTS

| 3,388,170 | 6/1968 | Magat et al. ............... 568/608 |
|---|---|---|
| 4,496,632 | 1/1985 | Camp et al. ............... 252/52 A |
| 4,521,330 | 6/1985 | Olstowski et al. ......... 252/51.5 R |
| 4,587,365 | 5/1986 | Anchor ...................... 568/608 |
| 4,793,939 | 12/1988 | Mori et al. ................. 252/52 A |
| 4,828,735 | 5/1989 | Minagawa et al. ......... 252/52 A |
| 4,851,144 | 7/1989 | McGraw et al. ............ 252/52 A |
| 4,994,626 | 2/1991 | Greenough et al. ........ 568/608 |
| 5,002,678 | 3/1991 | Vanover et al. ............ 252/52 A |
| 5,032,305 | 7/1991 | Kamakura et al. ......... 252/52 A |
| 5,143,640 | 9/1992 | Moxey ....................... 252/52 A |
| 5,286,398 | 2/1994 | Krespan .................... 252/52 A |
| 5,403,503 | 4/1995 | Seiki et al. ................ 252/52 A |
| 5,426,242 | 6/1995 | Moxey ....................... 568/624 |
| 5,431,835 | 7/1995 | Katafuchi et al. .......... 252/52 A |
| 5,576,275 | 11/1996 | Moxey ....................... 508/562 |

FOREIGN PATENT DOCUMENTS

| 8404754 | 12/1984 | European Pat. Off. |
|---|---|---|
| 0268920 | 6/1988 | European Pat. Off. |
| 0355977 | 2/1990 | European Pat. Off. |
| 1445009 | 5/1966 | France. |
| 3201478 | 4/1983 | Germany. |
| 133205A | 10/1975 | Japan. |

*Primary Examiner*—Jacqueline V. Howard
*Attorney, Agent, or Firm*—Brooks Haidt Haffner & Delahunty

[57] ABSTRACT

A polyether having the formula $$RX[(C_xH_{2x}O)_n(C_yH_{2y}O)_pZ]_m \qquad (I)$$

wherein:

R is either an alkyl or alkyl phenyl group having from 7 to 30 carbon atoms,

X is selected from O, S or N;

x is an integer from 2 to 4;

y is an integer from 6 to 30;

Z is a hydrocarbyl group containing from 1 to 30 carbon atoms;

m is 1 when X is O or S or m is 2 when X is N;

n and p are such that the polyether contains between 1 and 40% by weight of $(C_yH_{2y}O)$ units and between 40 and 80% by weight of $(C_xH_{2x}O)$ units; and the molecular weight of the polyether is between 500 and 3,500. Lubricating oil compositions comprising such polyethers are disclosed. A method of preparing the polyethers is disclosed and comprises preparing a H-capped polyether, preparing an alkali-metal salt thereof and reacting said salt with an alkylating agent.

10 Claims, No Drawings

LUBRICATING OIL COMPOSITIONS CONTAINING SPECIFIED END-CAPPED POLYETHERS

This application is a continuation, of application Ser. No. 08/246,927, filed May 20, 1994 now abandoned, which is a continuation of Ser. 07/992,244, filed Dec. 14, 1992, now abandoned.

The present invention relates to new polyether automotive or industrial lubricating oils.

Multigrade lubricating oils for use in automotive engines comprise several components, in particular viscosity index improvers, which function to enhance the viscometric properties of the lubricating oil. However, the use of viscosity index improvers is not without its disadvantages, for their degradation products during service can increase the deposits on the inlet valves and other parts of the engine and thereby impair its efficiency.

The use of polyethers as components of lubricating oils is known. Thus, Japanese Kokai 50/133205 discloses a lubricating oil composition in which polyoxyalkylene glycol ethers of general formula (1) and/or (2):

$$R_1\text{-O-}(AO)_n\text{—}R_2 \qquad (1)$$

$$R_1\text{-O-}[(AO)_m\text{—}CH_2]_2\text{—}(AO)_m\text{-}R_1 \qquad (2)$$

(where $R_1$ and $R_2$ are hydrogen or 1-24C straight chain or branched hydrocarbon groups, m is 1–100, n is an integer in the range 1–50, AO is an oxyalkylene group, A is a $C_pH_{2p}$ alkylene group, p being an integer in the range 2–26, and the ratio number of carbon atoms/number of oxygen atoms in the molecule is made 3.5–9.5 through copolymerisation with one or more 8–26C alpha-olefin oxides as (AO)) are mixed with mineral oil of lubricating oil viscosity. Polyethers according to the invention of the prior art document are said to have better solubility in mineral oil than conventional polyethylene glycol, polypropylene glycol and polyethylene/polypropylene glycol and to have superior viscosity index improvement and pour point depression characteristics as compared with conventional viscosity index improvers, such as polymethacrylate and polybutene, for example. The following observations can be made regarding the disclosure of this patent publication:

(i) No distinction is made between the properties of a polyether wherein $R_1$ and $R_2$ are hydrogen and a polyether in which $R_1$ and $R_2$ are hydrocarbyl groups. In this connection the Examples illustrate the preparation of both uncoupled and coupled hydrogen-terminated polyethers.

(ii) The ability to improve the viscosity index and lower the pour point is said to be greater as the values of m and n are greater, i.e. as the molecular weight is greater, and as the viscosity increases. It is perhaps relevant that the polyethers used in the determinations upon which this observation is based contain 50% or greater of the 8–26C alpha-olefin oxide.

(iii) No specific mention is made of the possibility of $R_1$ being an aryl hydrocarbyl group.

EP 246612 describes a lubricating oil composition based upon a mixture of mineral oil and a polyether. Whilst the description indicates that the polyether is freely soluble in the mineral oil, only compositions in which 5 to 60% by weight of the polyether is present are taught as being advantageous. The polyether is one having the general formula $R[(C_nH_{2n}O)_x(C_mH_{2m}O)_yH]_z$ where R is a moiety derived from an organic starter, n is 2 to 4, m is 6 to 40, x and y are integers, z is 1 to 8 and the content of $(C_mH_{2m}O)$ groups in the polyether is 15 to 60% by weight.

The polyethers of this invention are hydrogen-terminated materials.

EP 0355977 discloses an industrial or automobile lubricating oil, for use, e.g. as automotive or industrial gear lubricants, two-stroke engine lubricants, which comprise (a) 0 to 40% by weight of mineral oil(s) and (b) 100 to 60% by weight of a polyether having the general formula $RX[(C_xH_{2x}O)_n(C_yH_{2y}O)_pH]_m$ wherein R is $C_9$ to $C_{30}$ alkyl or alkylphenyl, X is O, S or N, x is 2 to 4, y is 6 to 30, m is 1 or 2 and n and p are such that the polyether contains between 1 and 35% by weight of $(C_yH_{2y}O)$ units and between 35 and 80% by weight of $(C_xH_{2x}O)$ units. Again no reference is made to hydrocarbyl group-terminated polyethers.

None of the aforesaid prior art discloses the use of such polyethers, or compositions comprising such polyethers, as inlet-valve deposit inhibitors. However, the use of polyethers for this purpose is described in our copending unpublished UK application No. 9115911.1 which discloses the use of a lubricating oil as an inlet valve deposit inhibitor characterised in that the lubricating oil composition comprises a polyether of the formula:

$$RX[(C_xH_{2x}O)_n(C_yH_{2y}O)_pH]_m$$

wherein R is either an alkyl or alkyl phenyl group having from 7 to 30 carbon atoms, X is selected from O, S or N, or RX together represent H, x is an integer from 2 to 4, y is an integer from 6 to 30, m is 1 when X is O or S or when RX together represent H, or m is 2 when X is N, and n and p are such that the polyether contains between 0 and 40% by weight of $(C_yH_{2y}O)$ units and between 35 and 80% by weight of $(C_xH_{2x}O)$ units. There is no reference in this disclosure, however, to the use of hydrocarbyl group-terminated polyethers for the purpose of inlet-valve deposit inhibition.

The problem with the prior art to be solved is to improve lubricating oil compositions containing polyethers, particularly with regard to at least one of the properties:—compatibility, viscosity index improvement and inlet-valve deposit inhibition. The present invention solves the problem posed by the prior art by using as an essential component of lubricating oil compositions hydrocarbyl group-terminated polyethers of strictly defined composition and molecular weight.

Accordingly, the present invention provides a polyether having the formula (I):

$$RX[(C_xH_{2x}O)_n(C_yH_{2y}O)_pZ]_m \qquad (I)$$

wherein:

R is either an alkyl or alkyl phenyl group having from 7 to 30 carbon atoms;

X is either O, S or N;

x is an integer from 2 to 4;

y is an integer from 6 to 30;

Z is a hydrocarbyl group containing from 1 to 30 carbon atoms;

m is 1 when X is O or S, or m is 2 when X is N;

n and p are such that the polyether contains between 1 and 40% by weight of $(C_yH_{2y}O)$ units and between 40 and 80% by weight of $(C_xH_{2x}O)$ units; and the molecular weight of the polyether is between 500 and 3,500.

The polyether having the formula (I) may suitably comprise from 0.1 to 99%, preferably from 1 to 70%, more preferably from 5 to 50%, most preferably from 5 to 25% by weight of the composition.

As regards the moiety R in the formula (I), this is suitably either an alkyl or an alkyl phenyl group having from 7 to 30 carbon atoms. When R is an alkyl group it is preferably a $C_{10}$ to $C_{24}$ alkyl group, such as may be obtained from the corresponding fatty acid alcohol, thiol or amine. Of the alkyl groups, most preferred are alkyl groups having from 12 to 18 carbon atoms. In the case where R is alkyl phenyl, R preferably has from 9 to 30 carbon atoms with phenyl groups substituted with one or more $C_6$ to $C_{12}$ alkyl groups being most preferred. Particularly preferred are phenyl groups substituted with two $C_2$ to $C_{12}$ alkyl groups.

X in the formula (I) can be O, or S or N. Preferably X is O and RX is derived from a phenol, for example dinonyl phenol. On the other hand RX can be derived from a thiol or an amine.

In addition to the moiety R and the group X the polyether is comprised of an oxyalkylene backbone of formula $[(C_xH_{2x}O)_n(C_yH_{2y}O)_pZ]$. Such backbones can be created by alkoxylating a starter molecule of formula $RX(H)_m$ with two or more alkylene oxides consecutively so that the backbone formed comprises blocks of units of a given type, i.e. a block copolymer. It is optional whether the alkylene oxide of formula $C_xH_{2x}O$ or the alkylene oxide of formula $C_yH_{2y}O$ is reacted initially with the starter molecule. Alternatively, and very much preferred for the purpose of the present invention, the alkoxylation can be carried out using a mixture of alkylene oxides, i.e. reacting two or more alkylene oxides simultaneously, in which case the backbone formed will comprise a random distribution of the units. For each of the two types of alkylene oxide, $C_xH_{2x}O$ and $C_yH_{2y}O$, one or more different alkylene oxides can be used. The only constraint is that in the final polyether, the total number of units having the formula $C_xH_{2x}O$ should comprise between 40 and 80, preferably between 40 and 70, more preferably between 45 and 65% by weight and the total number of units having the formula $C_yH_{2y}O$ should comprise between 1 and 40, preferably 8 to 40, more preferably 10 to 30% by weight.

It is preferred that the units of formula $(C_xH_{2x}O)$ are mainly, i.e. greater than 50 mole%, comprised of oxypropylene $(C_3H_6O)$ units. Most preferred are those polyethers where the $C_xH_{2x}O$ groups are exclusively oxypropylene. As regards the $(C_yH_{2y}O)$ units these are preferably such that y is in the range from 10 to 20, preferably 12 or 16. A preferred $(C_yH_{2y}O)$ unit is derived from hexadecene-1-oxide, i.e. y=16.

Z in the formula (I) is a hydrocarbyl group containing from 1 to 30 carbon atoms. Suitably the hydrocarbyl group is either an alkyl or an aryl group, preferably containing from 1 to 12 carbon atoms. More preferred are alkyl groups containing from 1 to 3 carbon atoms, with methyl or ethyl groups being most preferred.

The polyethers preferably have a molecular weight in the range 500 to 3,500, preferably 700 to 3000, more preferably in the range from 800 to 2500 most preferably 1200 to 2400. For the avoidance of doubt, the term 'molecular weight' as used in this specification means the weight average molecular weight as measured by Gel Permeation Chromatography using polystyrene standards.

A preferred polyether is a random oxyalkylene backbone chain polyether of the formula (I) wherein:

R=a $C_{12-C18}$ alkyl group or a phenyl group substituted with at least one $C_6$ to $C_{12}$ alkyl group;

X=O;

x=3;

y=12 to 18, preferably 12 or 16

Z=a $C_1$ to $C_3$ alkyl group, preferably methyl or ethyl;

m=1 n and p are such that the polyether contains between 10 and 30% by weight of $(C_yH_{2y}O)$ units and between 40 and 70% by weight of $(C_xH_{2x}O)$ units; and the molecular weight of the polyether is in the range from 700 to 3000, preferably from 800 to 2500, most preferably from 1,200 to 2,400.

In a further aspect of the present invention there is provided a lubricating oil composition comprising at least one polyether having the formula (I):

$$RX[(C_xH_{2x}O)_n(C_yH_{2y}O)_pZ]_m \qquad (I)$$

wherein:

R is either an alkyl or alkyl phenyl group having from 7 to 30 carbon atoms;

X is either O, or S or N;

x is an integer from 2 to 4;

y is an integer from 6 to 30;

z is a hydrocarbyl group containing from 1 to 30 carbon atoms;

m is 1 when X is O or S, or m is 2 when X is N;

n and p are such that the polyether contains between 1 and 40% by weight of $(C_yH_{2y}O)$ units and between 40 and 80% by weight of $(C_xH_{2x}O)$ units; and the molecular weight of the polyether is between 500 and 3,500.

The polyether having the formula (I) may suitably comprise from 0.1 to 99%, preferably from 1 to 70%, more preferably from 5 to 50%, most preferably from 5 to 25% by weight of the composition.

The use of polyethers having the formula (I) in lubricating oil compositions rather than hydrogen-terminated (i.e. non-capped polyethers) has the advantages that the compatibility of the polyether with either base fluid components, for example mineral oil or synthetic ester fluids, additives and viscosity index improvers is superior and also the viscosity index improver properties are increased. Furthermore, lubricating oil compositions according to the invention have good inlet valve cleanliness properties.

Polyethers having the formula (I) can be prepared by reacting in a first step a starter molecule $RX(H)_m$ with a mixture of $(C_xH_{2x}O)$ and $(C_yH_{2y}O)$ in appropriate proportions at elevated temperature, suitably in the presence of a basic catalyst, for example an alkali metal hydroxide, for a time sufficient to substantially completely polymerise the mixture and then optionally removing the catalyst; in a second step forming an alkali metal salt of the polymer formed in the first step, suitably by reaction in an inert solvent, for example toluene, with an alkali metal alkoxide, for example sodium methoxide, dissolved in a suitable inert solvent, which in the case of an alkali metal alkoxide as the reactant is preferably the alcohol eliminated in the reaction, for example methanol in the case of sodium methoxide as the reactant, and removing low-boiling solvent(s) from the mixture; and in a third step reacting at elevated temperature the product of the second step with a $C_1$ to $C_{30}$ hydrocarbyl monohalide for example chloromethane, or other reagent comprising a $C_1$ to $C_{30}$ hydrocarbyl radical and a good leaving group, e.g. tosylate, and removing the alkali metal salt so-formed. Alternatively, the polyether of formula I can be prepared from a block copolymer which is prepared in the first step. The second and third steps would be carried out as described above.

Thus, according to a further aspect of the invention, there is provided a method of preparing a polyether as defined above comprising:

(a) in a first step reacting a starter molecular $RX(H)_m$ with $C_xH_{2x}O$ and $C_yH_{2y}O$ either simultaneously or consecutively to give a polymer of formula II

(b) in a second step forming an alkali metal salt of the polymer of formula II formed in (a), and (c) in a third step reacting the product formed in the second step with a reagent comprising a hydrocarbyl radical and a good leaving group, wherein R, X, x, y, m, n, p have the meanings as set out above.

In addition to the polyether or polyethers of formula (I) the lubricating oil composition may also contain a viscosity index improver (VII). Suitable VIIs include olefin copolymers (OCPs), for example ethylene/propylene copolymers, polymethacrylates (PMAS), dispersant OCPs, i.e. OCPs modified to contain nitrogen compounds, OCP-PMA graft copolymers, styrene/butadiene copolymers and styrene/isoprene copolymers. All the aforesaid types of VIIs are commercially available.

The lubricating oil composition may also contain other additives commonly employed in such compositions. Such additives include, for example, dispersants, detergents, antioxidants, metal passivators, corrosion inhibitors, pour point depressants, high pressure agents and/or anti-wear agents. It is common for a combination of two or more of the aforesaid additives to be contained in an additive package specifically formulated for lubricating oil composition depending upon its particular application.

Where the lubricating oil composition is for use in a gasoline fuel engine it is preferred that any detergent is present in the composition in the range 2–4%, any dispersant in the range 4–7%, any antioxidant in the range 0 to 0.5% and the EP/AW additive in the range 0.5 to 2% by weight.

Alternatively, if the composition is for use in a diesel fuel engine, it is preferred that any detergent is present in the composition in the range 2–6%, any dispersant in the range 1–7%, any antioxidant in the range 0 to 0.5% and any EP/AW additive in the range 0.5 to 2% by weight.

The composition may contain, in addition to the polyether having the formula (I), at least one further base fluid component in the form of, for example, either a poly-alpha-olefin (PAO), a synthetic ester, a hydrocracked mineral oil or a mineral oil. Suitably the PAO may be, for example, an oligomer of decene-1. Suitable esters include polyol esters and dibasic acid esters. A suitable hydrocracked mineral oil is Lavera Hydrocracker residue (LHC) obtainable from BP Oil. Alternatively Shell's XHVI may be employed.

The components of the lubricating oil composition are suitably mixed in proportions such that they are compatible. Such proportions will be well-known to those skilled in the art without experimentation, though it is a simple matter to determine stable compositions by experiment, if desired. An advantage of using an end-capped polyether of the formula (I) as compared with an H-terminated polyether is that the compatibility is improved, so that greater amounts may be employed if desired.

Preferred lubricating oil compositions comprise:

(A)(i) a base fluid comprising from 40 to 70%, preferably 45 to 65%, of a hydrocracked mineral oil; from 20 to 45%, preferably 20 to 40% of an ester, preferably a polyol ester and from 5 to 25%, preferably from 10 to 20% of a polyether having the formula (I), the amounts of the components being selected within the aforesaid ranges such as to total 100%;

(ii) from 3 to 8% of a VII, preferably a PMA or styrene/butadiene VII; and (iii) from 10 to 14%, preferably about 12%, of an additive package.

(B)(i) a base fluid comprising from 50 to 80%, preferably from 60 to 70%, of a poly alpha-olefin (PAO); from 0 to 15% of an ester, preferably a polyol ester and from 10 to 50%, preferably from 10 to 30%, of a polyether having the formula (I); the amounts of the base components being selected within the aforesaid ranges such as to total 100%;

(ii) from 4 to 12%, preferably from 5 to 10%, of a VII, which is preferably either a PMA or a styrene/butadiene copolymer; and (iii) from 10 to 14%, preferably about 12%, of an additive package (C)(i) a base fluid comprising from 50 to 90%, preferably from 60 to 80%, of a hydrocracked mineral oil; and from 10 to 50% of a polyether having the formula (I); the amounts of the base components being selected within the aforesaid ranges such as to total 100%;

(ii) from 4 to 12%, preferably from 6 to 10%, of a VII, which is preferably either a PMA or a styrene/butadiene VII; and (iii) from 10 to 14%, preferably about 12%, of an additive package.

Suitably, composition A is targeted to meet the viscosity grades SAE OW/5W-30/40/50, preferably 5W-30. Suitably composition B is targeted to meet the viscosity grades SAEOW/5W/10W-30/40/50, preferably 5W-40. Suitably composition C is targeted to meet the viscosity grades SAE5W/10W-30/40/50, preferably 5W-40.

The lubricating oil compositions according to the invention may be used as industrial or automotive lubricants.

In another aspect the present invention provides the use of a lubricating oil composition as hereinbefore defined as an automotive engine inlet-valve deposit inhibitor.

The invention will now be further illustrated by reference to the following Examples. The extent of methyl-capping is determined by measuring the hydroxyl content before and after the methyl-capping reaction.

(A) Preparation

COMPARATIVE EXAMPLE 1

Preparation of H-terminated polyalkylene glycol

Dinonylphenol (250 g) was heated in the presence of potassium hydroxide (2.5 g) as catalyst whilst vacuum stripping the water of reaction, then reacted simultaneously at 115° C. and 50psi with propylene oxide (500 g) and hexadec-1-ene oxide (250 g) to a theoretical molecular weight of 1380. The catalyst was removed by treatment with Magnesol (magnesium silicate), vacuum stripping and filtration to yield 1000 g of an oil-soluble polyalkylene glycol having the composition shown below:

| Composition (% wt) | |
| --- | --- |
| Dinonyl phenol | 25.0 |
| Propylene oxide | 50.0 |
| Hexadec-1-ene oxide | 25.0 |

EXAMPLE 2

(according to the invention)
Preparation of methyl-terminated polyalkylene glycol Polyalkylene glycol prepared according to Comparative Example 1 (1500 g) was dissolved in toluene (1500 g) and reacted with sodium methoxide (87 g) in methanol solution and the methanol of reaction/solution removed by azeotropic distillation. The resulting material was then reacted with chloromethane (97 g) at 90° C. and, after cooling, residual excess alkalinity was neutralised with hydrochloric acid. The liberated sodium chloride was agglomerated by addition of water and magnesium sulphate.

After filtration and vacuum stripping there remained an oil-soluble methyl-terminated polyalkylene glycol.

COMPARATIVE EXAMPLE 3

Preparation of H-terminated polyalkylene glycol

A $C_{12}$–$C_{14}$ linear secondary alcohol (220 g) was heated in the presence of potassium hydroxide (2.5 g) as catalyst whilst vacuum stripping the water of reaction, then reacted simultaneously at 115° C. and 50 psi with propylene oxide (651 g) and hexadec-1-ene oxide (129 g) to a theoretical molecular weight of 870. The catalyst was removed by treatment with Magnesol (magnesium silicate), vacuum stripping and filtration to yield 1000 g of an oil-soluble polyalkylene glycol having the composition:

| Composition (% wt) | |
| --- | --- |
| Secondary $C_{12}$–$C_{14}$ alcohol | 22.0 |
| Propylene oxide | 65.1 |
| Hexadec-1-ene oxide | 12.9 |

EXAMPLE 4

(according to the invention)
Preparation of methyl-terminated polyalkylene glycol The product of Example 3 (700 g) was dissolved in toluene (700 g) and reacted with sodium methoxide (43 g) in methanol solution and the methanol of reaction/solution removed by azeotropic distillation. The resulting material was then reacted with chloromethane (40 g) at 90° C. and, after cooling, residual excess alkalinity was neutralised with hydrochloric acid. The liberated sodium chloride was agglomerated by addition of water and magnesium sulphate. After filtration and vacuum stripping there remained an oil-soluble methyl-terminated polyalkylene glycol.

Examples 5 and 6 were carried out according to the method set out in Examples 1 and 2 except that the mole ratio of propylene oxide to hexa-dec-1-ene oxide was 31.0:1.3, and the reactants reacted to a theoretical molecular weight of 2,400.

(B) Properties

EXAMPLE 7

The viscometric properties of the polyalkylene glycols of Examples 1 to 6 were determined. The results are given in Table 1.

EXAMPLE 8

The compatibility in a multigrade lubricating oil, expressed as the percentage of polyalkylene glycol in base fluid that gives a compatible formulation, was determined for the polyalkylene glycols of Examples 1 to 6 using a formulation consisting of base fluid (hydrocracked mineral oil+polyalkylene glycol), additive pack (10%) and VII (10%). The results are given in Table 2.

The results indicate that either VI or compatibility or both are improved when a methyl-terminated polyalkylene glycol is used in place of the hydrogen-terminated material.

TABLE 1

| Example | Visc at 100° C. (cSt) | Visc at 30° C. (cSt) | Visc at <0° C. (cP) | Visc Index | Molar % Me-capped |
| --- | --- | --- | --- | --- | --- |
| 1 | 17.9 | 157 | 4800(−5) | 126 | |
| 2 | 15.3 | 107.7 | 3600(−10) | 149 | 96% |
| 3 | 9.02 | 48.8 | 2700(−20) | 167 | |
| 4 | 8.51 | 37.75 | 2240(−25) | 212 | 91% |
| 5 | 25.8 | 191 | 4800(−5) | 172 | |
| 6 | 24.8 | 159 | 3300(−5) | 190 | 91% |

TABLE 2

| Example | Compatibility (%) |
| --- | --- |
| 1 | 30 |
| 2 | 50 |
| 3 | 10 |
| 4 | 35 |
| 5 | 15 |
| 6 | 15 |

We claim:

1. A lubricating oil composition for automotive use comprising a base engine fluid selected from the group Consisting of a poly-alpha-olefin, a synthetic ester, a hydrocracked mineral oil, and a mineral oil and at least one polyether having the formula $$RX(C_xH_{2x}O)_n(C_yH_{2y}O)_pZ)_m \quad (I)$$

wherein:

R is either an alkyl or an alkyl phenyl group having from 7 to 30 carbon atoms;

X is selected from oxygen, sulfur or nitrogen;

x is an integer from 2 to 4;

y is an integer from 6 to 30;

z is a hydrocarbyl group containing from 1 to 30 carbon atoms;

m is 1 when X is oxygen or sulfur, or m is 2 when X is nitrogen;

n and p are such that the polyether contains between 1 and 40% by weight of ($C_yH_{2y}O$) units and between 40 and 80% by weight of ($C_xH_{2x}O$) units; and the molecular weight of the polyether is between 500 and 3,500.

2. A lubricating oil composition as claimed in claim 1 wherein in the polyether having the formula (I) R is a phenyl group substituted with two $C_2$ to $C_{12}$ alkyl groups.

3. A lubricating oil composition as claimed in either claim 1 or claim 2 wherein X in the polyether having the formula (I) is oxygen.

4. A lubricating oil composition as claimed in claim 1 or 2 wherein RX in the polyether having the formula (I) is derived from dinonyl phenol.

5. A lubricating oil composition as claimed in claim 1 or 2 wherein in the polyether having the formula (I) the total number of units having the formula $C_yH_{2y}O$ comprises between 10 and 30% by weight.

6. A lubricating oil composition as claimed in claim 1 or 2 wherein in the polyether having the formula (I) greater than 50 mole % of the $C_xH_{2x}O$ units are oxyproplene units.

7. A lubricating oil composition as claimed in claim 1 or 2 wherein in the polyether having the formula (I) the $C_xH_{2x}O$ units are oxyproplene units.

8. A lubricating oil composition as claimed in claim 1 or 2 wherein in the polyether having the formula (I) y is an integer from 12 to 16.

9. A lubricating oil composition as claimed in claim 1 or 2 wherein in the polyether having the formula (I) z is methyl or ethyl.

10. A lubricating oil composition as claimed in claim 1 or 2 wherein in the polyether having the formula (I) the backbone chain comprises a random distribution of the $(C_xH_{2x}O)$ and $(C_yH_{2y}O)$ units.

* * * * *

UNITED STATES PATENT AND TRADEMARK OFFICE
CERTIFICATE OF CORRECTION

PATENT NO. : 5,652,204
DATED : July 29, 1997
INVENTOR(S) : ROBERT CRACKNELL and JOHN ROBERT MOXEY It is certified that error appears in the above-indentified patent and that said Letters Patent is hereby corrected as shown below:

Col. 3, l. 66, formula should read "$C_{12}-C_{18}$"

Col. 8, in the heading of Table 1, change "30°C" to --40°C--

Claim 1, lines 2 and 3, after "group", correct the word to --consisting--

Signed and Sealed this

Thirteenth Day of January, 1998

Attest:

BRUCE LEHMAN

*Attesting Officer*     *Commissioner of Patents and Trademarks*